United States Patent
Gerard

(10) Patent No.: US 11,040,504 B2
(45) Date of Patent: Jun. 22, 2021

(54) METHOD FOR PRODUCING A MULTILAYER COMPOSITE MATERIAL, MULTILAYER COMPOSITE MATERIAL OBTAINED BY THE METHOD AND MECHANICAL PARTS OR STRUCTURES PRODUCED WITH SAID MATERIAL

(71) Applicant: Arkema France, Colombes (FR)

(72) Inventor: Pierre Gerard, Lacq (FR)

(73) Assignee: Arkema France, Colombes (FR)

( * ) Notice: Subject to any disclaimer, the term of this patent is extended or adjusted under 35 U.S.C. 154(b) by 354 days.

(21) Appl. No.: 15/997,026

(22) Filed: Jun. 4, 2018

(65) Prior Publication Data

US 2018/0281320 A1   Oct. 4, 2018

Related U.S. Application Data

(63) Continuation of application No. 14/772,101, filed as application No. PCT/FR2014/050518 on Mar. 7, 2014, now abandoned.

(30) Foreign Application Priority Data

Mar. 7, 2013   (FR) ...................................... 13.52057

(51) Int. Cl.
*B32B 27/12* (2006.01)
*B29C 70/54* (2006.01)
(Continued)

(52) U.S. Cl.
CPC .......... *B29C 70/545* (2013.01); *B29C 70/745* (2013.01); *B32B 3/08* (2013.01);
(Continued)

(58) Field of Classification Search
CPC ... B32B 3/266; B32B 27/12; B32B 2307/412; B32B 2260/021; B29C 70/545
See application file for complete search history.

(56) References Cited

U.S. PATENT DOCUMENTS 2,322,582 A    6/1943  Marini
5,961,900 A *  10/1999 Wedi ....................... B28B 13/02
                                                          264/145

(Continued)

FOREIGN PATENT DOCUMENTS

DE     102006049913 A1    4/2008   ............. B32B 25/08
GB           803770          10/1958
(Continued)

OTHER PUBLICATIONS

JPS61225013 Hasegawa English Translation (Year: 1986).*
(Continued)

*Primary Examiner* — Jacob T Minskey
*Assistant Examiner* — Adrien J Bernard
(74) *Attorney, Agent, or Firm* — Thomas F. Roland

(57) ABSTRACT

Method for producing a multilayer composite material, according to which said multilayer composite material, multilayer composite material obtained by the method and mechanical parts or structures produced with said material. The present invention concerns a method for producing a multilayer composite material, according to which said multilayer composite material comprises one or a plurality of thermoplastic polymer layers, one of which is a surface layer (1) comprising a thermoplastic polymer A, and comprises a substrate layer (2) comprising a thermoplastic (meth)acrylic polymer matrix and a fibrous reinforcing material, said method involving cutting at least one window in the thermoplastic polymer layer or layers and at least one window in the fibrous material, said windows being intended to coincide; impregnating the fibrous material with a liquid (meth)acrylic syrup such that it fills said windows, or inserting a transparent thermoplastic plate into said window; polymerizing the liquid (meth)acrylic syrup impregnating the fibrous material and present in the absence of a (Continued)

thermoplastic plate in the window or windows. The invention is applicable applies to the production of mechanical parts of structured elements or decorative items made from multilayer composite material and requiring transparent windows.

20 Claims, 2 Drawing Sheets

(51) Int. Cl.
| | |
|---|---|
| B32B 3/08 | (2006.01) |
| B29C 70/74 | (2006.01) |
| B32B 3/26 | (2006.01) |
| B32B 5/18 | (2006.01) |
| B29L 31/00 | (2006.01) |
| B29K 23/00 | (2006.01) |
| B29K 25/00 | (2006.01) |
| B29K 33/04 | (2006.01) |
| B29K 55/02 | (2006.01) |
| B29K 81/00 | (2006.01) |
| B29L 9/00 | (2006.01) |

(52) U.S. Cl.
CPC ............... *B32B 3/266* (2013.01); *B32B 5/18* (2013.01); *B32B 27/12* (2013.01); *B29K 2023/04* (2013.01); *B29K 2023/10* (2013.01); *B29K 2025/06* (2013.01); *B29K 2033/04* (2013.01); *B29K 2055/02* (2013.01); *B29K 2081/06* (2013.01); *B29L 2009/00* (2013.01); *B29L 2031/7782* (2013.01); *B32B 2260/021* (2013.01); *B32B 2260/046* (2013.01); *B32B 2307/412* (2013.01); *B32B 2419/00* (2013.01); *B32B 2451/00* (2013.01); *B32B 2457/00* (2013.01); *B32B 2457/12* (2013.01); *B32B 2603/00* (2013.01); *B32B 2605/00* (2013.01); *B32B 2605/12* (2013.01); *B32B 2605/18* (2013.01)

(56) References Cited

U.S. PATENT DOCUMENTS

| | | | |
|---|---|---|---|
| 2002/0046517 A1 | 4/2002 | Kondo | ................... B29C 45/16 52/204.591 |
| 2002/0106952 A1 | 8/2002 | Hashizume | ....... B29C 45/14221 442/43 |
| 2004/0185733 A1 | 9/2004 | Murai | ................... B29C 70/22 442/265 |
| 2005/0051255 A1 | 3/2005 | Nordman | |
| 2007/0152466 A1 | 7/2007 | Yang | ..................... H04M 15/00 296/100.06 |
| 2007/0252305 A1 | 11/2007 | Kuo | ................... B29C 37/0082 264/255 |
| 2008/0122137 A1 | 5/2008 | Hamaoka | .......... B29C 45/14688 264/255 |
| 2009/0009942 A1 | 1/2009 | Hsu | ................... B29C 45/14811 361/679.09 |
| 2009/0061145 A1 | 3/2009 | Lin | ..................... B29C 45/1671 428/67 |
| 2009/0218725 A1 | 9/2009 | Thelemann | ............. B29C 45/16 264/251 |
| 2011/0183135 A1* | 7/2011 | Gerard | ................... C08L 33/12 428/220 |
| 2011/0222214 A1 | 9/2011 | Lan | ..................... B29C 45/1671 361/679.01 |
| 2012/0021196 A1* | 1/2012 | Kenney | ..................... B32B 5/26 428/213 |
| 2013/0210303 A1* | 8/2013 | Doi | ........................ B32B 27/32 442/67 |
| 2014/0221568 A1* | 8/2014 | Kikuta | .................... B32B 27/08 524/747 |
| 2014/0315036 A1* | 10/2014 | Kobayashi | ................ C09J 4/06 428/522 |
| 2015/0352818 A1 | 12/2015 | Glotin | .................... B32B 27/12 428/442 |

FOREIGN PATENT DOCUMENTS

| | | | | |
|---|---|---|---|---|
| JP | S61225013 | * | 10/1986 | ............ B29C 39/10 |
| JP | 08207556 | A | 8/1996 | |
| JP | 2011126213 | A | 6/2011 | |
| WO | WO 2012136235 | A1 | 10/2012 | ......... B29C 37/0032 |
| WO | WO 20141013028 | | 1/2014 | |

OTHER PUBLICATIONS

Machine Translation of JP 08207556 A, Aug. 1996 (Year: 1996).
Machine Translation of DE 102006049913 A1, Apr. 2008.
Machine Translation of JP 2011126213 A, Jun. 2011.
Machine Translation of WO 2012136235 A1, Oct. 2012.
U.S. Appl. No. 14/760,547, filed Jul. 13, 2015, Glotin, et al.

\* cited by examiner

METHOD FOR PRODUCING A MULTILAYER COMPOSITE MATERIAL, MULTILAYER COMPOSITE MATERIAL OBTAINED BY THE METHOD AND MECHANICAL PARTS OR STRUCTURES PRODUCED WITH SAID MATERIAL

This application is a Continuation Application of copending U.S. Ser. No. 14/772,101 filed Sep. 2, 2015, and claims benefit, under U.S.C. § 119 or § 365 of PCT Application Number PCT/FR2014/050518, filed Mar. 7, 2014, and French patent application FR 13.52057, filed Mar. 7, 2013, said applications incorporated herein by reference.

FIELD OF THE INVENTION

The present invention relates to a process for manufacturing a multilayer composite material comprising a surface layer comprising a thermoplastic polymer A, a substrate layer comprising a polymeric composite material based on a thermoplastic (meth)acrylic polymer matrix and a reinforcing fibrous material, and which allows the formation of one or more windows comprising a thermoplastic material, which may be transparent.

The process is particularly suited to the production of parts or elements of two-dimensional or three-dimensional mechanical structures or of decorative articles requiring one or more windows comprising a thermoplastic material, which may be transparent.

A subject of the invention is also a multilayer composite material comprising one or more windows made of thermoplastic material which may be transparent, obtained via the process and parts or elements of two-dimensional or three-dimensional mechanical structures or of decorative articles made with said material.

Mechanical parts that have to withstand high stresses during their use are widely manufactured from composite materials. A composite material is a macroscopic combination of two or more non-miscible materials. The composite material consists of at least one material which forms the matrix, i.e. a continuous phase that ensures the cohesion of the structure, and a reinforcing material.

The purpose of using composite materials is to obtain from the composite material performance qualities that are not available from each of its constituents when they are used alone. Consequently, composite materials are widely used in several industrial sectors, for instance building, automotive, aerospace, transport, leisure, electronics, and sport notably due to their better mechanical performance (higher tensile strength, higher tensile modulus, higher fracture toughness) in comparison with homogeneous materials, and their low density.

The most important class, in view of volume at the commercial industrial scale, is that of composites with organic matrices, in which the matrix material is generally a polymer. The main matrix or continuous phase of a polymeric composite material is either a thermoplastic polymer or a thermosetting polymer.

Thermosetting polymers consist of crosslinked three-dimensional structures. The crosslinking is obtained by curing reactive groups in said prepolymer. Curing may be obtained, for example, by heating the polymer chains in order to crosslink and harden the material permanently.

In order to prepare the polymeric composite material, the prepolymer is mixed with the other component such as glass beads or fibers, or the other component is wetted or impregnated and cured afterwards. Examples of prepolymers or matrix materials for thermosetting polymers are unsaturated polyesters, vinyl esters, and epoxy or phenolic materials.

A major drawback of a thermosetting polymeric matrix is its crosslinking. The matrix cannot be easily fashioned into other forms. Once the polymer has crosslinked, the form is set. This also makes the recycling of thermosetting composite material difficult, and manufactured mechanical or structured parts or articles comprising said thermosetting composite material are burned in a cement plant or thrown into a waste dump.

To allow thermoforming and recycling, it is preferred to use thermoplastic polymers.

Thermoplastic polymers consist of linear or branched polymers, which are not crosslinked. The thermoplastic polymers are heated in order to mix the constituents required for manufacturing the composite material and are cooled to set the final form. The problem of these molten thermoplastic polymers is their very high viscosity.

In order to prepare a polymeric composite material based on thermoplastic polymer, a thermoplastic polymer resin in the molten state, commonly known as a "syrup" is used to impregnate the reinforcing material, for example a fibrous substrate. Once polymerized, the thermoplastic polymeric syrup constitutes the matrix of the composite material. At the time of impregnation, the viscosity of the impregnation syrup must be controlled and adapted so as not to be too fluid or too viscous, so as to correctly impregnate each fiber of the fibrous substrate and to avoid the appearance of defects in the final composite material, which give rise, inter alia, to a loss of mechanical strength of the final composite material. A syrup that satisfies this problem was developed by the Applicant and is described in patent applications FR 1159553, or its PCT extension WO 2013/056845, and in patent application FR 1256929 or its PCT extension WO 2014/013028.

It turns out in practice that the surface of parts or elements of two-dimensional or three-dimensional mechanical structures manufactured from fiber-based composite materials is neither esthetic nor decorative. The reason for this is that the structure of the fibers or the fibrous substrate is visible at the surface. The surface is not flat, or else the surface of said parts or elements of the mechanical structure is non-uniform in the sense that the surface bears roughness.

For the purpose of obtaining a better finish quality for the visible surface of the composite material based on reinforcing fibers, an additional surface layer is applied. This may be performed by means of a "gel coat" surface coat or a coat of paint.

The gel coat is usually produced chemically by an epoxy resin or an unsaturated polyester, treated to form a crosslinked polymer which adheres to the composite material.

Due to the crosslinking of the surface layer, the multilayer material comprising a thermoplastic composite loses the properties of thermoplastic polymers and can no longer be thermoformed or recycled.

The Applicant solved this problem, surprisingly, by means of a multilayer composite material and of a manufacturing process described in its as yet unpublished patent application PCT/EP 2013/050660 filed on Jan. 15, 2013.

The multilayer composite material for producing mechanical parts or structured elements or articles, described in said patent application, comprises:
  a) a surface layer comprising a thermoplastic polymer A,
  b) a substrate layer comprising a polymeric composite material, mainly characterized in that the polymeric composite material comprises a thermoplastic polymeric (meth)acrylic matrix and a reinforcing fibrous material in which the fibrous material comprises either fibers with an aspect ratio at least equal to 1000, or said fibrous material has a two-dimensional macroscopic structure.

Technical Problem

However, the Applicant is confronted with another technical problem, namely the production of transparent or non-transparent windows in multilayer composite materials. This need is particularly experienced in the production of mechanical parts or structured elements or articles that require a visibility zone in the sense that it can be seen through, for instance a motor vehicle windshield, a visibility screen in an appliance shell (for instance recharging terminals, roadside emergency terminals, etc.), a boat hull including portholes, a car sunroof or alternatively for decorative objects.

The aim of the present invention is to solve this technical problem.

The invention is directed toward proposing a process for producing a multilayer composite material which can be performed at low cost, which includes the production of one or more windows made of transparent or non-transparent material and which allows manufacture at the industrial scale, for producing structural parts made of a thermoplastic multilayer composite material comprising at least one transparent or non-transparent window. Moreover, the process should be quick and simple to perform using commercially available components. The manufacture of the parts should also be reproducible and fast, meaning short cycle times.

Another object of the present invention is to be able to manufacture a composite multilayer structure for producing parts comprising a thermoplastic composite material with one or more transparent or non-transparent windows, having a surface appearance that satisfactorily hides the fibrous appearance of the surface layer while at the same time remaining a thermoplastic composite material.

Another object of the present invention is to be able to manufacture multilayer structural parts comprising a thermoplastic composite material with one or more transparent or non-transparent windows, in which the adhesion between the various respective layers does not require any additional adhesive materials.

Another aim of the present invention is to be able to manufacture multilayer structural parts comprising a thermoplastic composite material with transparent or non-transparent windows, which can be transformed and fashioned by virtue of the flexibility of each layer.

Another object of the invention is to be able to recycle structural parts comprising a multilayer material which are worn out or which do not meet the manufacturing quality criteria.

PRIOR ART

Document WO 2012/088569 describes a production process for testing the surface quality of composites.

Document WO 2012/136235 describes a process for producing a bodywork multi-fiber composite material with a class A surface coating. The surface is obtained by applying a spray via a mold coating system and processing. The coating is not thermoplastic and, consequently, it cannot be thermoformed or recycled.

Document WO 2007/021797 describes a powdered coating composition for coating the surface of thermoplastic composites. The powdered coating comprises a vinyl acetate copolymer and a thermoplastic or thermosetting binder.

Document US 2005/051255 describes a process for manufacturing a multilayer composite material for the manufacture of a thin panel with transparent windows. The windows are made by means of metal frames in the panel.

No prior art document describes mechanical parts or structured elements or articles comprising a thermoplastic multilayer composite material comprising one or more windows, which make it possible to solve the technical problems mentioned above. No document describes a process for manufacturing such a material.

BRIEF DESCRIPTION OF THE INVENTION

The Applicant has discovered, surprisingly, that a process for manufacturing a multilayer composite material for producing mechanical parts or structured elements or articles, comprising the following steps:
  a) cutting out at least one window in one or more layers made of thermoplastic polymer, one of the layers being a surface layer (1) comprising a thermoplastic polymer A, and at least one window in a reinforcing fibrous material comprising long fibers, said windows being intended to coincide,
  b) optionally inserting a thermoplastic plate in said window(s),
  c) impregnating the fibrous material with a liquid (meth) acrylic syrup so that the syrup also fills said at least one window, in the absence of the thermoplastic plate,
  d) polymerizing the liquid (meth)acrylic syrup impregnating the fibrous material and present, in the absence of the thermoplastic plate, in the window(s), makes it possible to obtain a multilayer material that solves the technical problems mentioned above.

Thus, the windows are produced via the same process for manufacturing the multilayer composite material. The production of one or more windows is included in the steps for manufacturing the multilayer composite material. According to the process, the material present in the windows is obtained by inserting a thermoplastic plate into said windows and/or with the impregnation and polymerization steps for manufacturing the multilayer composite material, which represents a saving in time and simplification for the manufacture of parts at the industrial scale. The insertion of a transparent or non-transparent thermoplastic plate into the window(s) in the process for manufacturing the multilayer composite material makes it possible, by means of the impregnation and polymerization steps, to integrally attach/seal the plate(s) to the layers constituting the composite material and to obtain a material with one or more transparent or non-transparent windows.

The process does not require bonding or welding of an added transparent part.

The Applicant has also found that a multilayer composite material obtained according to the process described and comprising:
  a) one or more layers made of thermoplastic polymer, one of which is a surface layer (1) comprising a thermoplastic polymer A,
  b) a substrate layer (2) comprising a polymeric composite material comprising a (meth)acrylic thermoplastic polymer matrix and a reinforcing fibrous material, said fibrous material consisting of long fibers, and
  c) at least one window in the thermoplastic polymer and substrate layers, said window being filled with a thermoplastic material consisting of the thermoplastic (meth)acrylic polymer matrix or a thermoplastic plate, makes it possible to produce mechanical parts or structured elements or articles with windows filled with a thermoplastic material.

According to another aspect of the invention, the multilayer composite material comprises an additional intermediate layer between the surface layer and the substrate layer, said intermediate layer comprising a thermoplastic polymer B comprising a window also filled with the thermoplastic material or the thermoplastic plate.

DETAILED DESCRIPTION

According to a first aspect, the present invention relates to a process for manufacturing a multilayer composite material for producing mechanical parts or structured elements or articles, comprising the following steps:
a) cutting out at least one window in one or more layers made of thermoplastic polymer, one of the layers being a surface layer (1) comprising a thermoplastic polymer A, and at least one window in a reinforcing fibrous material (2) consisting of long fibers, said windows being intended to coincide,
b) optionally inserting a thermoplastic plate in said window(s),
c) impregnating the fibrous material with a liquid (meth) acrylic syrup so that the syrup also fills said at least one window, in the absence of the thermoplastic plate,
d) polymerizing the liquid (meth)acrylic syrup impregnating the fibrous material and present, in the absence of the thermoplastic plate, in the window(s).

According to a first embodiment, the process comprises:
thermoforming the surface layer comprising a thermoplastic polymer A,
laying the reinforcing fibrous material on one face of the surface layer before step c) of impregnating said fibrous material.

The surface layer comprising the thermoplastic polymer A, for the thermoforming, is in the form of a film or plate.

Said film or plate has a thickness of less than 10 mm, preferably less than 6 mm.

According to a second embodiment, the process comprises:
laminating the surface layer (1) on at least one face, the other face being in contact with one face of the reinforcing fibrous material (2), this lamination step being performed after the polymerization step d).

Advantageously, the plate inserted in the window(s) is transparent and allows light transmission of greater than 65%, preferably greater than 75% and more preferably greater than 85%.

The cutting out in step a) is performed in a single step after superposition of the surface layer and of the fibrous material or separately for the fibrous material and for the surface layer.

Advantageously, the cutting out in step a) is performed by means of a cutting tool such as scissors, a cutting press, a punch or a laser.

Advantageously, the impregnation of the fibrous material in step c) is performed in a closed mold.

Step c) of impregnating the reinforcing fibrous material with the (meth)acrylic liquid syrup and step d) of polymerizing the (meth)acrylic liquid syrup are performed in the same closed mold.

The term "surface layer" as used denotes the upper or outer layer of the multilayer composite material exposed to the environment.

The term "substrate layer" as used denotes the layer comprising the thermoplastic polymeric composite material of the multilayer composite.

The term "intermediate layer" as used means that this layer is between the surface layer and the substrate layer of the multilayer composite material.

The term "fibrous material" as used refers to fabrics, webs, felts or nonwovens that may be in the form of strips, laps, braids, locks or pieces.

The term "window" as used relates to a cutaway made in the layers forming the composite material and intended to be filled with a thermoplastic material that may be transparent.

The term "transparent window" as used relates to a window filled with a transparent thermoplastic material.

The term "thermoplastic plate" as used means a plate made of thermoplastic polymer.

The term "transparent" as used means allowing the passage of light of the visible spectrum with light transmission of greater than 65%, according to the light transmission measurements defined by standard ASTM D 1003.

The term "(meth)acrylic" as used refers to any type of acrylic or methacrylic monomer.

The term "(meth)acrylic thermoplastic polymer matrix" as used refers to a (meth)acrylic thermoplastic polymer matrix, essentially polymers comprising monomers in a proportion of 50% by weight or more of the (meth)acrylic thermoplastic polymer matrix.

The term "PMMA" as used refers to homo- and copolymers of methyl methacrylate (MMA), the ratio of MMA in the PMMA being at least 70% by weight for the MMA copolymer.

The term "monomer" as used refers to a molecule which can undergo polymerization.

The term "polymerization" as used refers to the process of converting a monomer or a mixture of monomers into a polymer.

The term "thermoplastic polymer" as used refers to a polymer that turns to a liquid or becomes more liquid or less viscous when heated and that can take on new shapes by the application of heat and pressure (thermoforming). After cooling, the polymer becomes hard and keeps its new modeled shape.

The term "thermosetting polymer" as used refers to a prepolymer in a liquid, solid or viscous state that changes irreversibly into an unmeltable, insoluble polymeric network by curing.

The term "polymeric composite" as used refers to a multicomponent material comprising several different phase domains, among which at least one type of phase domain is a continuous phase and in which at least one component is a polymer.

As regards the structural parts or elements made with the multilayer composite material, they are panels, lids, shells or parts made of composite material for aircraft, boats (hulls or bridges), wagons, parts of motor vehicles or agricultural machines (bodywork, hoods, doors), and electrical or electronic appliance cases.

As regards the (meth)acrylic polymer, mention may be made of polyalkyl methacrylates or polyalkyl acrylates. In a preferred embodiment the (meth)acrylic polymer is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth)acrylate. Preferably, the comonomer is an alkyl acrylate in which the alkyl group contains from 1 to 4 carbon atoms.

According to a preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer containing at least one ethylenic unsaturation that can copolymerize with methyl methacrylate. Preferably, the comonomer is chosen from methyl acrylate and ethyl acrylate, or mixtures thereof.

The weight-average molecular weight of the (meth)acrylic polymer should be high, meaning larger than 50 000 g/mol, preferably larger than 100 000 g/mol.

The weight-average molecular weight may be measured by steric exclusion chromatography (SEC) or gel permeation chromatography (GPC). The polymers are dissolved at 1 g/l in BHT-stabilized THF. The calibration is performed using monodisperse polystyrene standards.

As regards the (meth)acrylic monomer, the monomer is chosen from acrylic acid, methacrylic acid, alkyl acrylic monomers, alkyl methacrylic monomers and mixtures thereof.

Preferably, the monomer is chosen from acrylic acid, methacrylic acid, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate and isobornyl methacrylate, and mixtures thereof.

More advantageously, the (meth)acrylic monomer is chosen from methyl methacrylate, isobornyl acrylate and acrylic acid, and mixtures thereof.

According to a preferred embodiment, at least 50% by weight and preferably at least 60% by weight of the monomer is methyl methacrylate.

According to a more preferred embodiment, at least 50% by weight, preferably at least 60% by weight, more preferably at least 70% by weight, advantageously at least 80% by weight and even more advantageously 90% by weight of the monomer is a mixture of methyl methacrylate with isobornyl acrylate and/or acrylic acid.

As regards the fibrous substrate, mention may be made of fabrics, webs, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear long fibers. The fibers may be discontinuous or continuous. The fibers may be arranged randomly or in the form of a continuous filament parallel to each other. A fiber is defined by its aspect ratio, which is the ratio between the length and the diameter of the fiber. The fibers used in the present invention are long fibers or continuous fibers. The fibers have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibers, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibers or mixtures thereof, an assembly of the two-dimensional form in the third dimension.

The origins of the fibrous material may be natural or synthetic. As natural material one can mention plant fibers, wood fibers, animal fibers or mineral fibers.

Natural fibers are, for example, sisal, jute, hemp, flax, cotton, coconut fibers, and banana fibers. Animal fibers are, for example, wool or hair.

As synthetic material, mention may be made of polymeric fibers chosen from fibers of thermosetting polymers, of thermoplastic polymers or mixtures thereof.

The polymeric fibers may be made of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibers may also be chosen from glass fibers, especially of E, R or S2 type, carbon fibers, boron fibers or silica fibers.

The fibrous substrate of the present invention is chosen from plant fibers, wood fibers, animal fibers, mineral fibers, synthetic polymeric fibers, glass fibers and carbon fibers, or mixtures thereof.

Preferably, the fibrous substrate is chosen from mineral fibers.

The fibers of the fibrous substrate have a diameter between 0.005 µm and 100 µm, preferably between 1 µm and 50 µm, more preferably between 5 µm and 30 µm and advantageously between 10 µm and 25 µm.

Preferably, the fibers of the fibrous substrate of the present invention are chosen from continuous fibers (meaning that the aspect ratio does not necessarily apply as for long fibers) for the one-dimensional form, or for long or continuous fibers for the two-dimensional or three-dimensional form of the fibrous substrate.

As regards the liquid (meth)acrylic syrup according to the invention that impregnates the fibrous substrate, it comprises a (meth)acrylic monomer or a mixture of (meth)acrylic monomers, a (meth)acrylic polymer and at least one initiator or initiating system for starting the polymerization of the (meth)acrylic monomer. The viscosity is increased by using a (meth)acrylic monomer or a mixture of a (meth)acrylic monomer with a dissolved (meth)acrylic polymer or a (meth)acrylic polymer. This solution is commonly referred to as "syrup" or "prepolymer".

The liquid (meth)acrylic syrup must have a controlled viscosity for the impregnation process of the present invention, especially for correct and total wetting and impregnation of the fibrous substrate. The dynamic viscosity of the liquid (meth)acrylic syrup is in a range from 10 mPa*s to 10 000 mPa*s, preferably from 50 mPa*s to 5000 mPa*s and advantageously from 100 mPa*s to 1000 mPa*s. The viscosity of the syrup can be readily measured with a rheometer or a viscometer. The dynamic viscosity is measured at 25° C. The liquid (meth)acrylic syrup has Newtonian behavior, meaning that there is no shear-thinning, so that the dynamic viscosity is independent of the shear in a rheometer or of the speed of the spindle in a viscometer.

Advantageously, the liquid (meth)acrylic syrup does not voluntarily comprise any solvent additives.

The liquid (meth)acrylic polymer is completely soluble in the (meth)acrylic monomer.

This (meth)acrylic polymer is PMMA, i.e. the homopolymer or a copolymer of methyl methacrylate (MMA) or a mixture thereof as defined previously.

The (meth)acrylic monomer is the same as defined previously.

The (meth)acrylic monomer(s) are present in a proportion of 40% by weight in the liquid (meth)acrylic syrup, preferably 50% by weight, advantageously 60% by weight and more advantageously 65% by weight of the total amount of the (meth)acrylic syrup.

The polymer(s) of the liquid (meth)acrylic syrup are present in a proportion of at least 10% by weight and more advantageously of at least 20% by weight of the total amount of the (meth)acrylic syrup.

The polymer(s) of the liquid (meth)acrylic syrup are present in a proportion of not more than 60% by weight, preferably not more than 50%, advantageously not more than 40% and more advantageously not more than 35% by weight of the total amount of the liquid (meth)acrylic syrup.

The process for manufacturing composite parts is chosen from resin transfer molding and infusion.

Resin transfer molding is a process using a two-sided mold set which forms both surfaces of a composite material. The lower side is a rigid mould. The upper side can be a rigid or flexible mould. Flexible molds can be made from composite materials, silicone or extruded polymer films such as nylon. The two sides fit together to form a mold cavity. The distinguishing feature of resin transfer molding is that the fibrous substrate is placed into this cavity and the mold set is closed prior to the introduction of the liquid (meth)acrylic syrup. Resin transfer molding includes numerous varieties which differ in the mechanics of introduction of the liquid (meth)acrylic syrup into the fibrous substrate in the mold cavity. These variations range from vacuum infusion to vacuum assisted resin transfer molding (VARTM). This process may be performed at room or elevated temperature.

With the infusion process, the liquid (meth)acrylic syrup must have the appropriate viscosity for this process for preparing the polymeric composite material. The liquid (meth)acrylic syrup is sucked into the fibrous substrate, which is in a special mold, by applying a gentle vacuum. The fibrous substrate is infused and completely impregnated by the liquid (meth)acrylic syrup.

Another subject of the invention relates to a multilayer composite material comprising:
a) one or more layers made of thermoplastic polymer, one of which is a surface layer (1) comprising a thermoplastic polymer A,
b) a substrate layer (2) comprising a polymeric composite material comprising a (meth)acrylic thermoplastic polymer matrix and a reinforcing fibrous material, said fibrous material consisting of long fibers, and
c) at least one window in the thermoplastic polymer and substrate layers, said window being made of a thermoplastic material consisting of the thermoplastic (meth)acrylic polymer matrix or a plate made of thermoplastic material.

Advantageously, the window or each window is filled with a transparent thermoplastic plate made of PET (polyethylene terephthalate), or of polycarbonate, polystyrene or, preferably, PMMA (polymethyl methacrylate).

According to another subject, the composite material comprises an additional intermediate layer (3) between the surface layer (1) and the substrate layer (2), said intermediate layer comprising a thermoplastic polymer B.

The thermoplastic polymer A of the surface layer may be chosen from the polymers of the following list:
(meth)acrylic polymers,
saturated polyesters (PET, PBT, PLA etc.),
acrylonitrile-butadiene-styrene (ABS) copolymer,
styrene-acrylonitrile (SAN) copolymer,
acrylonitrile-styrene-acrylate (ASA) copolymer,
polystyrene (crystalline or high-impact),
polypropylene (PP),
polyethylene (PE),
polycarbonate (PC),
poly(phenylene oxide) (PPO),
polysulfone (PSU),
polyvinyl chloride (PVC),
polyvinylidene fluoride (PVDF),
chlorinated PVC (CPVC),
polyurethane (PU).

The surface layer may also comprise mixtures of two or more polymers of the above list of thermoplastic polymers.

The thermoplastic polymer A may comprise fillers or additives. Additives that may be mentioned include organic additives such as impact modifiers or block copolymers, heat stabilizers, flame-retarding elements, and mixtures thereof.

Preferably, the thermoplastic polymer A of the surface layer is chosen from (meth)acrylic polymers, acrylonitrile-styrene-acrylate (ASA) copolymer, polyvinylidene fluoride (PVDF) and polycarbonate (PC), or mixtures thereof.

Advantageously, the thermoplastic polymer A is chosen from (meth)acrylic polymers and preferably PMMA.

The thermoplastic polymer A of the surface layer may be in the form of a film, a plate or a sheet.

The thermoplastic polymer B of the intermediate layer may be chosen from the polymers of the following list:
(meth)acrylic polymers,
saturated polyesters (PET, PBT, PLA etc.),
acrylonitrile-butadiene-styrene (ABS) copolymer,
styrene-acrylonitrile (SAN) copolymer,
acrylonitrile-styrene-acrylate (ASA) copolymer,
polystyrene (crystalline or high-impact),
polypropylene (PP),
polyethylene (PE),
polycarbonate (PC),
poly(phenylene oxide) (PPO),
polysulfone (PSU), polyvinyl chloride (PVC),
polyvinylidene fluoride (PVDF),
chlorinated PVC (CPVC),
polyurethane (PU).

The polymer of the intermediate layer may also comprise mixtures of two or more polymers B of the above list of polymers B. for example, mixtures of PET/PC, of PMMA/PLA or ABS/PC mixtures.

The thermoplastic polymer B of the intermediate layer may comprise fillers or additives. Additives that may be mentioned include organic additives such as impact modifiers or block copolymers, heat stabilizers, UV stabilizers, flame-retarding elements, and mixtures thereof.

Preferably, the thermoplastic polymer B is chosen from (meth)acrylic polymers, acrylonitrile-butadiene-styrene (ABS) copolymer, acrylonitrile-styrene-acrylate (ASA) copolymer, polyvinylidene fluoride (PVDF) and polycarbonate (PC), or mixtures thereof.

Advantageously, the thermoplastic polymer B of the intermediate layer is an ABS or ASA.

The thermoplastic polymer B of the surface layer may be in the form of a film, a plate or a sheet.

The thermoplastic (meth)acrylic matrix of the substrate layer of the polymeric composite material comprises at least one (meth)acrylic polymer comprising one or more (meth) acrylic monomers. The (meth)acrylic monomer(s) represent at least 50% by weight or more, preferably 60% or more, advantageously 70% by weight and even more advantageously 80% by weight of the thermoplastic (meth)acrylic matrix.

Preferably, the (meth)acrylic polymer(s) represent at least 80% by weight and advantageously at least 90% by weight of the thermoplastic (meth)acrylic matrix.

In a preferred implementation example, the thermoplastic (meth)acrylic matrix comprises one or more (meth)acrylic polymers.

As regards the (meth)acrylic polymer, mention may be made of polyalkyl methacrylate or polyalkyl acrylate. In a preferred example, the (meth)acrylic polymer is a polyalkyl methacrylate.

As regards the use of the composite parts thus manufactured, mention may be made of automotive applications, nautical applications, railroad applications, sport, aeronautic and aerospace applications, photovoltaic applications, computer-related applications, telecommunication applications and wind energy applications, but also decorative objects.

The composite part is especially a motor vehicle part, boat part, train part, sport article, plane or helicopter part, space ship or rocket part, photovoltaic module part, wind turbine part, furniture part, construction or building part, telephone or cellphone part, computer or television part, or printer or photocopier part.

FIGURES

FIG. 1 is a diagram of a cross section AA of a multilayer composite material with a surface layer (1) comprising a thermoplastic polymer A, a substrate layer comprising a polymeric composite material (2) and a window 10 filled with a transparent thermoplastic material (20) in the thermoplastic polymer and substrate layers according to one subject of the invention. The transparent thermoplastic material is obtained via a transparent thermoplastic plate or by polymerization of the fibrous-substrate impregnation syrup.

Figure 1:
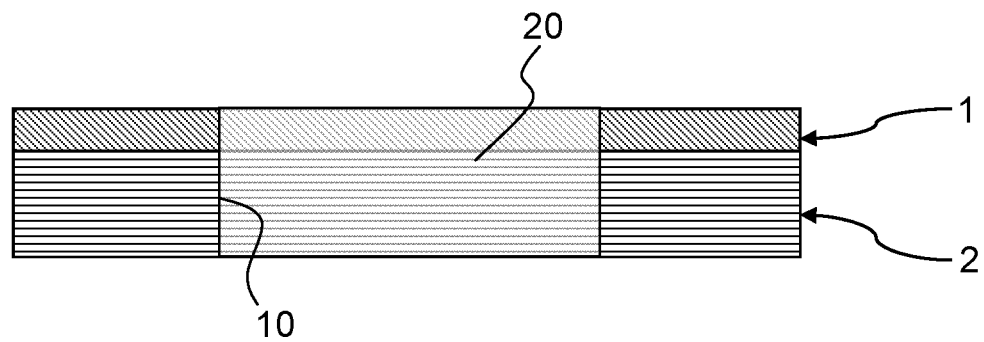
Figure 2:
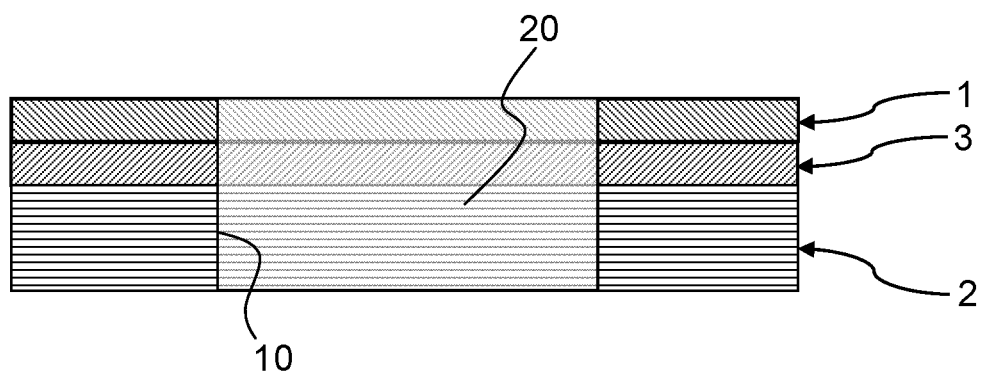
FIG. 2 is a diagram of a cross section of a multilayer composite material, comprising an additional intermediate layer (3) between the surface layer (1) and the substrate layer (2), said intermediate layer comprising a thermoplastic polymer B, the transparent thermoplastic material (20) filling the window passing through the layers (1), (3) and the substrate (2).
Figure 3:
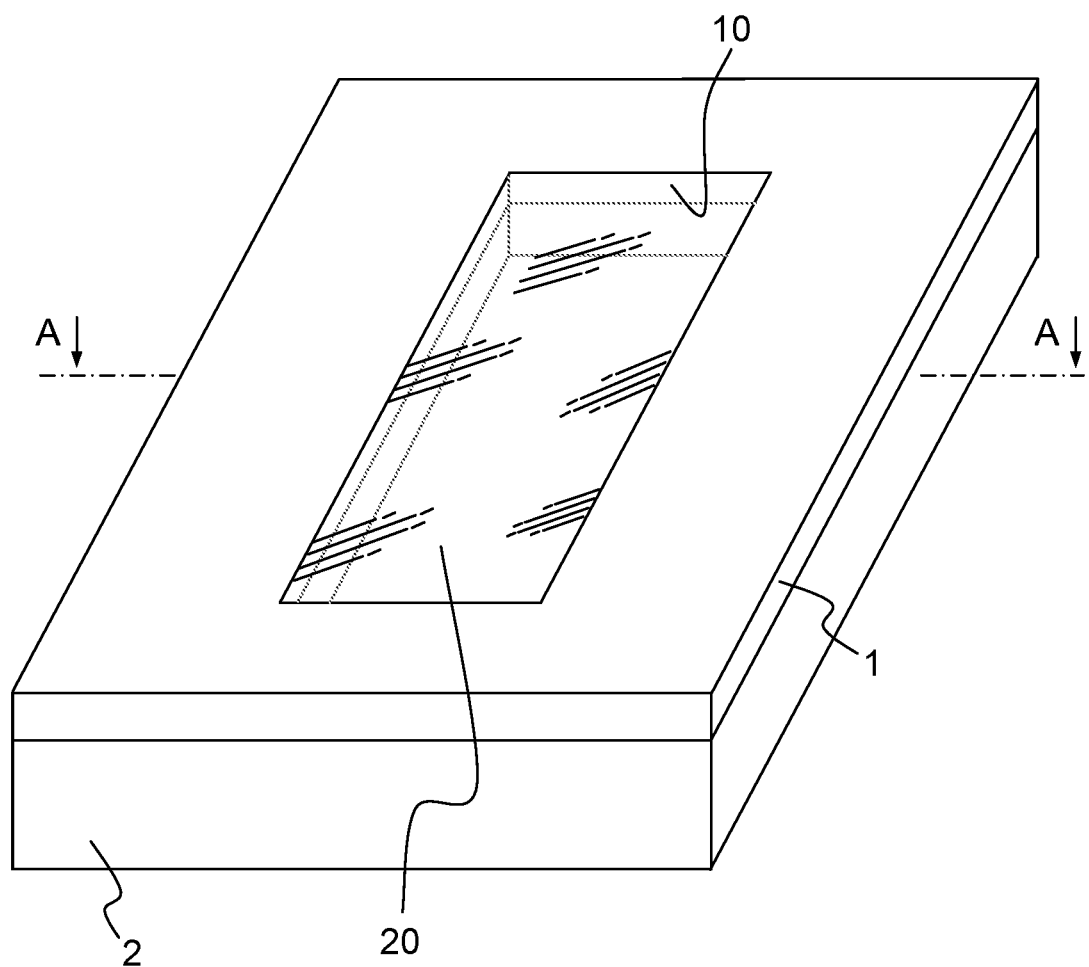
FIG. 3 is a perspective view of the material viewed in cross section in FIG. 1.
Figure 4:
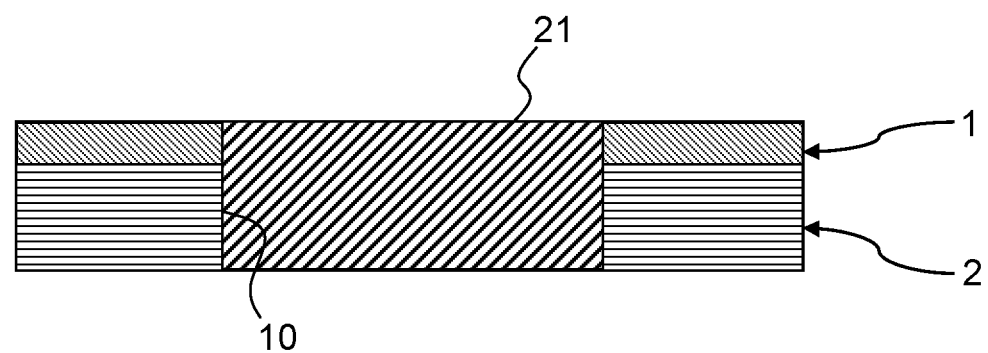
FIG. 4 is a view in cross section of a multilayer composite material according to the invention, comprising a window 10 comprising a non-transparent thermoplastic plate (21).

The invention claimed is:

1. A process for manufacturing a multilayer composite material for producing mechanical parts or structured elements or articles, wherein said process comprises the production of one or more windows in a thermoplastic material, said process comprising the following steps:
   a) cutting out at least one window in one or more layers made of thermoplastic polymer, one of the layers being a surface layer (1) comprising a thermoplastic polymer A, and at least one window in a reinforcing fibrous material consisting of long fibers, said windows being intended to coincide,
   b) impregnating the fibrous material with a liquid (meth) acrylic syrup so that the syrup fills said at least one window, wherein said liquid (meth)acrylic syrup impregnates into the fibrous substrate, impregnating each fiber, wherein the liquid (meth)acrylic syrup comprises a (meth)acrylic monomer or a mixture of (meth) acrylic monomers, a (meth)acrylic polymer and at least one initiator or an initiator system for starting the polymerization of the (meth)acrylic monomer
   c) polymerizing the liquid (meth)acrylic syrup impregnating the fibrous material and present, in the window(s).

2. The process for manufacturing a multilayer composite material as claimed in claim 1, wherein the multilayer composite material comprises an additional intermediate layer between the surface layer and the substrate layer, said intermediate layer comprising a thermoplastic polymer B comprising a window also filled with the thermoplastic material or the thermoplastic plate.

3. The process for manufacturing a multilayer composite material as claimed in claim 1, wherein said process further comprises the steps of:
   thermoforming the surface layer (1) comprising a thermoplastic polymer A,
   laying the fibrous material (2) on one face of the surface layer (1) before step b) of impregnating said fibrous material.

4. The process for manufacturing a multilayer composite material as claimed in claim 1, wherein said process further comprises:
   laminating the surface layer (1) on at least one face, the other face being in contact with one face of the fibrous material, this lamination step being performed after the polymerization step c).

5. The process for manufacturing a multilayer composite material as claimed in claim 1, wherein the cutting out in step a) is performed in a single step after superposition of the surface layer and of the fibrous material or separately for the fibrous material and for the surface layer.

6. The process for manufacturing a multilayer composite material as claimed in claim 1, wherein the cutting out in step a) is performed using a cutting tool such as a cutting press, a punch or a laser.

7. The process for manufacturing a multilayer composite material as claimed in claim 1, wherein the impregnation of the fibrous material in step b) is performed in a closed mold.

8. The process for manufacturing a multilayer composite material as claimed in claim 1, wherein step b) and step c) are performed in the same closed mold.

9. The process for manufacturing a multilayer composite material as claimed in claim 1, wherein the process step b) is chosen from resin transfer molding and infusion.

10. The process for manufacturing a multilayer composite material as claimed in claim 1, wherein the dynamic viscosity of the liquid (meth)acrylic syrup is in a range from 10 mPa·s to 10 000 mPa·s.

11. The process for manufacturing a multilayer composite material as claimed in claim 1, wherein the (meth)acrylic monomer(s) are present in a proportion of 40% by weight in the total amount of liquid (meth)acrylic syrup.

12. The process for manufacturing a multilayer composite material as claimed in claim 1, wherein the polymer(s) of the liquid (meth)acrylic syrup are present in a proportion of at least 10% by weight of the total amount of the (meth)acrylic syrup.

13. The process for manufacturing a multilayer composite material as claimed in claim 1, wherein the polymer(s) of the liquid (meth)acrylic syrup are present in a proportion of not more than 60% by weight of the total amount of the liquid (meth)acrylic syrup.

14. The process for manufacturing a multilayer composite material as claimed in claim 1, wherein the thermoplastic polymer A is selected from the group consisting of:
   (meth)acrylic polymers,
   saturated polyesters (PET, PBT, PLA etc.),
   acrylonitrile-butadiene-styrene (ABS) copolymer,
   styrene-acrylonitrile (SAN) copolymer,
   acrylonitrile-styrene-acrylate (ASA) copolymer,
   polystyrene (crystalline or high-impact),
   polypropylene (PP),
   polyethylene (PE),
   polycarbonate (PC),
   poly(phenylene oxide) (PPO),
   polysulfone (PSU),
   polyvinyl chloride (PVC),
   polyvinylidene fluoride (PVDF),
   chlorinated PVC (CPVC),
   polyurethane (PU),
      and a mixture thereof.

15. The process for manufacturing a multilayer composite material as claimed in claim 2, wherein the thermoplastic polymer B is selected from the group consisting of:
   (meth)acrylic polymers,
   saturated polyesters (PET, PBT, PLA etc.),
   acrylonitrile-butadiene-styrene (ABS) copolymer,
   styrene-acrylonitrile (SAN) copolymer,
   acrylonitrile-styrene-acrylate (ASA) copolymer,
   polystyrene (crystalline or high-impact),
   polypropylene (PP),
   polyethylene (PE),
   polycarbonate (PC),
   poly(phenylene oxide) (PPO),
   polysulfone (PSU),
   polyvinyl chloride (PVC),
   polyvinylidene fluoride (PVDF),
   chlorinated PVC (CPVC),
   polyurethane (PU),
      and a mixture thereof.

16. The process for manufacturing a multilayer composite material as claimed in claim 1, wherein the thermoplastic polymer A is chosen from (meth)acrylic polymers.

17. The process for manufacturing a multilayer composite material as claimed in claim 1, wherein the thermoplastic polymer B is chosen from acrylonitrile-butadiene-styrene copolymers.

18. The process for manufacturing a multilayer composite material as claimed in claim 1, wherein the thermoplastic (meth)acrylic matrix is chosen from homopolymers or copolymers of methyl methacrylate, or a mixture thereof.

19. The process for manufacturing a multilayer composite material as claimed in claim 18, wherein the thermoplastic (meth)acrylic matrix is chosen from the methyl methacrylate homopolymer or a copolymer comprising at least 70%, by weight of methyl methacrylate.

20. The process for manufacturing a multilayer composite material as claimed in claim 1, wherein the fibrous material is selected from the group consisting of plant fibers, wood fibers, animal fibers, mineral fibers, synthetic polymeric fibers, glass fibers and carbon fibers, and a mixture thereof.

* * * * *